(12) United States Patent
Adamo et al.

(10) Patent No.: US 7,219,196 B2
(45) Date of Patent: May 15, 2007

(54) PROCESS FOR MANAGING SYSTEM STACKS IN MICROCONTROLLERS, CORRESPONDING DEVICE AND COMPUTER PROGRAM PRODUCT

(75) Inventors: Santi Carlo Adamo, Gravina di Catania (IT); Edmondo Gangi, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 378 days.

(21) Appl. No.: 10/623,146

(22) Filed: Jul. 17, 2003

(65) Prior Publication Data

US 2004/0088528 A1    May 6, 2004

(30) Foreign Application Priority Data

Jul. 19, 2002    (EP)    .................................. 02425471

(51) Int. Cl.
G06F 12/00    (2006.01)
G06F 15/00    (2006.01)
G06F 9/00    (2006.01)
(52) U.S. Cl. ...................... 711/132; 711/100; 711/154; 712/244
(58) Field of Classification Search ................ 711/100, 711/154, 132, 244; 712/244
See application file for complete search history.

(56) References Cited

U.S. PATENT DOCUMENTS

| | | | | |
|---|---|---|---|---|
| 4,250,546 A | | 2/1981 | Boney et al. ................ 364/200 |
| 4,334,268 A | * | 6/1982 | Boney et al. ................ 712/234 |
| 5,361,370 A | * | 11/1994 | Sprague et al. ................ 712/22 |
| 5,530,804 A | * | 6/1996 | Edgington et al. ............ 714/30 |
| 5,638,524 A | * | 6/1997 | Kiuchi et al. ................ 712/221 |
| 5,832,258 A | * | 11/1998 | Kiuchi et al. ................ 712/226 |
| 5,857,088 A | * | 1/1999 | Keith et al. .................. 712/210 |
| 5,926,644 A | * | 7/1999 | Hays ........................... 712/22 |

FOREIGN PATENT DOCUMENTS

WO    WO 99/09469    2/1999

* cited by examiner

*Primary Examiner*—Tuan V. Thai
(74) *Attorney, Agent, or Firm*—Lisa K. Jorgenson; Robert Iannucci; Seed IP Law Group PLLC

(57) ABSTRACT

In order to manage, in the interrupt stage, a memory stack associated with a microcontroller according to a Program Counter signal and to a Condition Code Register signal that can be contained in respective registers, a first part of memory stack is provided which comprises a register for the Program Counter signal, and a second part of memory stack consisting of a bank of memory elements equal in number to the number of bits of the Condition Code Register signal for the number of the interrupts of the microcontroller. The two parts of stack are made to function in parallel by respective stack-pointer signals.

20 Claims, 2 Drawing Sheets

PROCESS FOR MANAGING SYSTEM STACKS IN MICROCONTROLLERS, CORRESPONDING DEVICE AND COMPUTER PROGRAM PRODUCT

BACKGROUND OF THE INVENTION

1. Field of the Invention

The present invention relates to the management of system stacks in microcontrollers and has been developed with particular attention paid to its possible application to the management of a system stack in a microcontroller, for example of the register-file-based type. Reference to the above possible application must not, however, be understood as in any way limiting the sphere of protection of the invention, which is of an altogether general nature.

2. Description of the Related Art

A typical operation that is very frequently carried out in a microcontroller is the storage/restoring of the state of the system in particular locations of the volatile memory (generally RAM). The above operation derives directly from the need to perform jumps to special routines at arbitrary instants in time, within the program flow, following upon occurrence of external or internal interrupts.

The state of the system consists of a certain number of registers, which is different for each microcontroller. Typically, the state can be reconstructed using the registers Program Counter (PC) and Condition Code Register (CCR), in addition to a variable number of other registers.

The operation of storage/restoring of the state may thus occupy the microcontroller for a time interval dedicated to the context-switching function. The said interval is usually quite long, owing to the sequentiality with which writing/restoring of the state in the system stack takes place. This determines a degradation in the overall performance, also in control applications that are not real-time ones.

Furthermore, very frequently the registers do not have dimensions equal to multiples of the length of the word of the volatile memory in which they are to be stored. A typical example of such a situation is the storage of the CCR, which normally consists of just a few bits.

Figure 1:
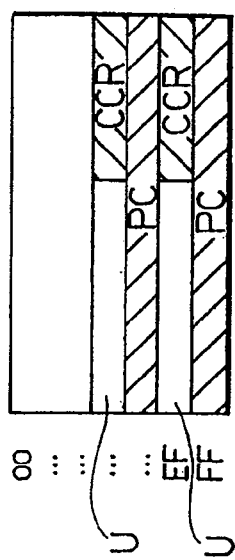

The situation in a RAM following upon one or more executions of different interrupts may therefore be the one represented—purely by way of example—in FIG. 1 of the annexed drawings, where the reference U designates unused memory locations.

The situation described above amounts to a waste of memory due to the small dimension of the CCR, or of any other state register that has a size that is small as compared to the length of the RAM word.

Figure 2:
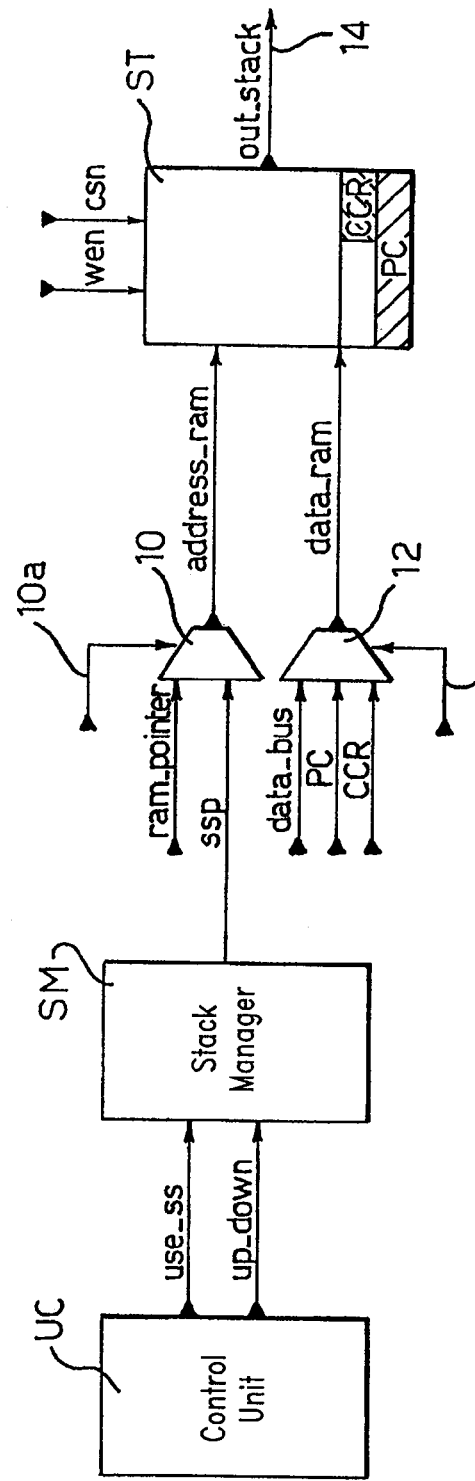

If a traditional solution is resorted to, such as the one illustrated by way of example in FIG. 2, management of the system stack within the RAM, designated by ST, takes place in a sequential way, without optimization of the area used by the system stack in the memory.

The traditional architecture represented in FIG. 2 envisages that a control unit UC will generate two signals use_ss and up_down addressed to the unit SM functioning as stack manager. The unit SM generates the pointer indicating the system stack, which is commonly referred to as System Stack Pointer or ssp, which is to be forwarded to a first module 10.

The module 10 functions as a multiplexer for selecting between the signal ssp—during context switching—and the signal ram_pointer, indicating the RAM address—during normal operation—, so as to generate a signal address_ram used for managing the portion of RAM dedicated to the addresses.

Another module 12, having the function of a multiplexer, receives at input, in addition to the signal data_bus coming from the data bus of the microcontroller, also two signals PC and CCR indicating the Program Counter and the Condition Code Register, respectively, the purpose being to generate at output the signal data_ram used for managing the portion of RAM dedicated to the data.

The references 10a and 12a designate the lines on which the signals for selecting the multiplexers regulating operation of the modules 10 and 12 are present, whilst the lines designated by wen and csn correspond to the lines on which the corresponding signals indicating, respectively, write enable and read enable of the RAM where the system stack resides are forwarded to the stack ST.

Present on the output line of the stack, designated by 14, is the corresponding output signal, out_stack.

The architecture represented in FIG. 2 corresponds to solutions of a known type, this fact rendering any further detailed description thereof superfluous.

The above solution is used, for example, in the microcontroller sold under the trade name ST 5 by STMicroelectronics, the assignee of the present application. This is a microcontroller of the type referred to as register-file-based.

Execution of the context-switching operation mentioned previously typically requires a time interval of approximately two clock cycles for a microcontroller of the ST 5 type and approximately ten clock cycles for a microcontroller of the accumulator-based type.

SUMMARY OF THE PRESENT INVENTION

An embodiment of the present invention overcomes the drawbacks presented by the solution according to the prior art referred to previously, so reducing both the waste of memory and the execution times for context switching.

The embodiment employs a procedure for stack management having the characteristics referred to specifically in the claims that follow.

The invention also relates to the corresponding device, as well as the corresponding computer product, which can be directly loaded into the internal memory of a computer and comprises portions of software code that can implement the procedure according to the present invention when the product is run on a computer.

In the currently preferred embodiment, the solution according to the present invention envisages the use of two enabling signals for two different stack managers. Recourse to this solution means that, in the case where the microcontroller has to execute, for example, a call instruction, it is necessary to store/restore a smaller amount of information. Added to this is the possibility of not having to gain access to one of the two stacks. For an instruction such as a call instruction it is not necessary, in fact, to store the CCR.

The fact of having two stacks to which access may be gained in a concurrent way improves performance in terms of the time required for context switching, in effect halving it. In addition, the possibility of using different types of memory to contain the system stack also enables improvement of use of the resources: stacks made with memory elements the row dimensions of which may be different from one another reduce the waste of locations, that would otherwise remain unused.

The solution according to the present invention is of general application, since it can be applied, for example, both to accumulator-based microcontrollers and to register-file-based microcontrollers. The solution according to the present invention is, moreover, independent of the number of registers stored during context switching and reduces the corresponding time, so improving overall performance of the microcontroller. In addition, the solution according to the present invention optimizes the use of the memory for the system stack.

BRIEF DESCRIPTION OF THE ANNEXED DRAWINGS

The invention will now be described, purely by way of non-limiting example, with reference to the annexed drawings, in which:

FIGS. 1 and 2, which regard the known art, have already been described above; and FIG. 3 illustrates, with a formalism that aims at enabling direct comparison with the known solution illustrated in FIG. 2, an architecture for management of a system stack operating according to the present invention.

DETAILED DESCRIPTION OF THE INVENTION

Figure 3:
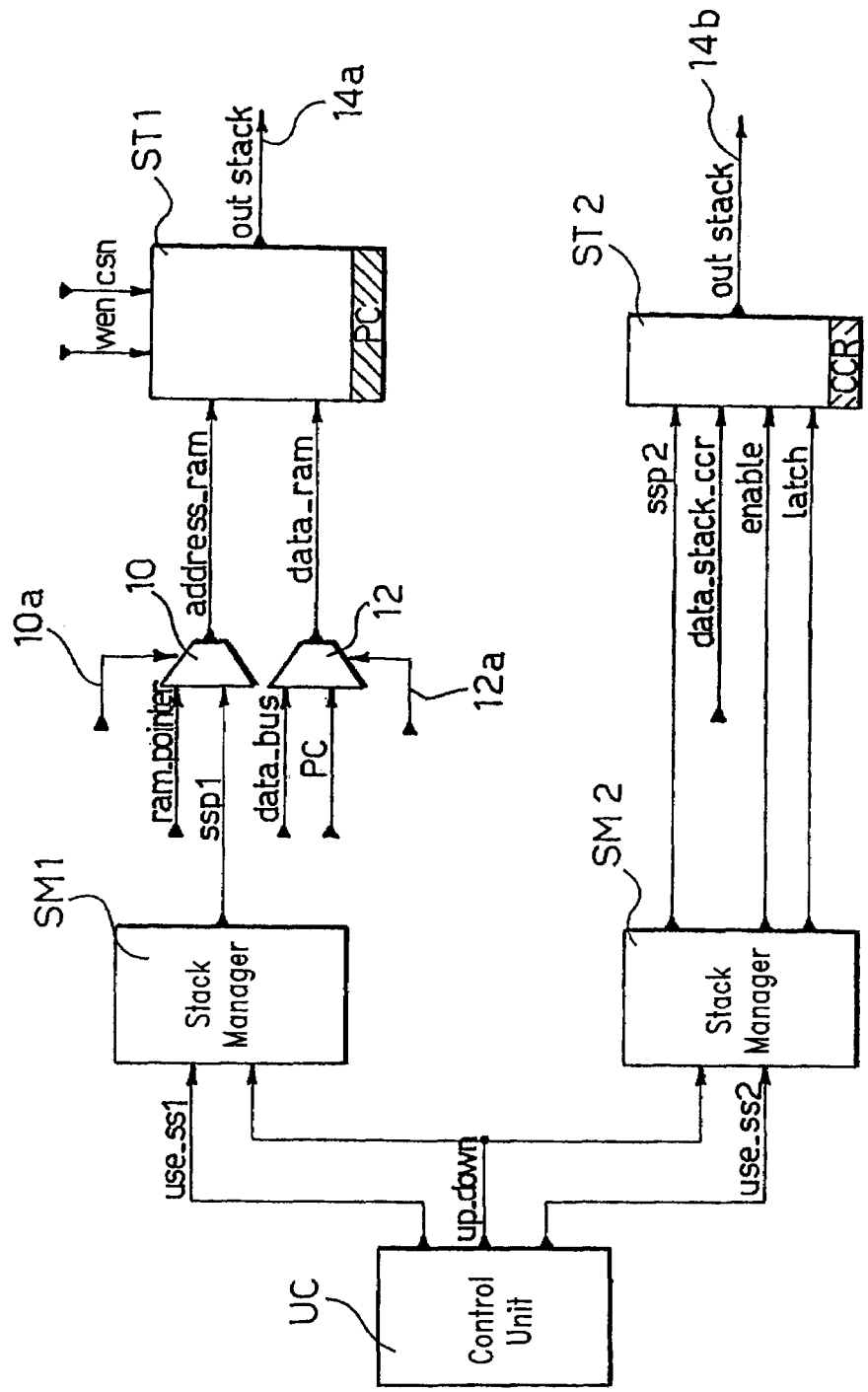

The example embodiment of the invention represented in FIG. 3 is essentially based upon the solution of splitting into two the architecture represented in FIG. 2.

Albeit maintaining the presence of a control unit UC for generating the signal up_down, which discriminates between a "push" operation and a "pop" operation (where the terms appearing in quotation marks are currently used in the relevant technical field), the presence is envisaged of two distinct task managers, designated by SM1 and SM2. The control unit UC sends to the managers SM1 and SM2 two signals use_ss1 and use_ss2, respectively, which issue to the manager SM1 and to the manager SM2 the order to execute a push operation or a pop operation.

Basically, the upper branch of the architecture represented in FIG. 3, which comprises the stack manager SM1, can be approximately assimilated—as regards its general structure—to the known structure represented in FIG. 2. For this reason, in the top part of FIG. 3, to designate signals or parts that are identical or equivalent to the ones already described previously with reference to the prior art, the same references already appearing in FIG. 2 are used. It is, therefore, superfluous to repeat here the corresponding description already provided previously.

It will, however, be appreciated that a different element, in the diagram of FIG. 3, is that only the signal PC coming from the Program Counter is sent to the module 12, together with the signal data_bus, and not the signal CCR representing the Condition Code Register.

In addition, in the diagram of FIG. 3, the signal ssp which represents the pointer indicating the system stack is, in effect, split into two components ssp1 and ssp2 generated by the stack manager SM1 and the stack manager SM2, respectively.

Operation of the scheme represented in FIG. 3 envisages that the two stack managers SM1 and SM2, driven by the control unit UC, will work in parallel so that:

one manager, SM1, will manage a first stack ST1 within a memory, such as a RAM, used in a conventional way, and the other manager, SM2, will manage a second stack ST2 consisting of a bank of memory elements (basically, flip-flops) purposely created and equal in number to the number of bits of the signal CCR representing the Condition Code Register times the number of the interrupts of the microcontroller.

The stack managers SM1 and SM2 operate by generating two stack pointer signals (namely, ssp1 and ssp2), the value of which is always equal to the first memory location available within the respective stack ST1 or ST2.

In particular, in the ensuing description, it will be assumed that, corresponding to each push operation on the stacks, there corresponds a decrement of the stack pointer associated therewith. In a complementary way, corresponding to each pop operation is an increment of the associated stack pointer.

The control unit UC thus generates three signals for driving the two stack manager modules SM1 and SM2:

a first signal up_down, the purpose of which is to discriminate between a push operation and a pop operation;

a signal use_ss1, the purpose of which is to enable explicitly the push operation or the pop operation on the first stack ST1, and a signal use_ss2 the purpose of which is to explicitly enable the push operation or the pop operation on the second stack ST2.

When an interrupt occurs, the control unit UC sets the signal up_down so as to obtain a push operation. Simultaneously, it drives the write signals of the two stacks and sets the signals use_ss1 and use_ss2 so as to indicate to the stack managers to decrement their own stack pointers in order to point to the next available location.

In a complementary way, for restoring the state at the end of the interrupt routine, the control unit UC sets the signal up_down so as to obtain a pop operation. Simultaneously, it drives the signals use_ss1 and use_so as to indicate to the managers to increment their own stack pointers in order to point to the next location containing the stored state which is to be restored. Finally, it sets the signals for the reading of the two stacks.

As regards the connections of the two stacks in question, it will be appreciated that the connections of the stack ST1 are practically identical to that of the single stack ST represented in FIG. 2, which regards the prior art.

The stack ST2, which is responsible for storage of the signal CCR, receives instead at input, in addition to the signal ssp2 already described previously, a signal data_stack_ccr, which indicates the value of the Condition Code Register, as well as the two signals, the enable signal and the latch signals, the function of which is to enable reading and writing, respectively, of the stack ST2.

The references 14a and 14b designate the corresponding output lines of the stacks ST1 and ST2, in which the corresponding read output signals are present.

If the traditional architecture represented in FIG. 2 is adopted, both the stage of writing in the system stack and the stage of reading from the system stack entail two clock cycles, one dedicated to the Program Counter and the other to the signal CCR. If, instead, recourse is had to the parallel architecture represented in FIG. 3, both the stage of writing in the stack and the stage of reading from the stack can be carried out in a parallel way for the Program Counter and for the CCR, just occupying a single clock cycle.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

Of course, without prejudice to the principle of the invention, the details of implementation and the embodiments may be amply varied with respect to what is described and illustrated herein, without thereby departing from the scope of the present invention, as defined in the annexed claims.

The invention claimed is:

1. A process for managing, in an interrupt stage, a memory stack associated with a microcontroller, having a number of interrupts, according to a Program Counter signal and to a Condition Code Register signal that includes bits, that can be contained in respective registers, the process comprising the operations of:
providing a first part of memory stack, comprising a register for said Program Counter signal, and a second part of memory stack, made up of a bank of memory elements equal in number to the bits of said Condition Code Register signal times the number of interrupts of the microcontroller; and
causing said two parts of memory stack to function in parallel by employing respective stack-pointer signals.

2. The process according to claim 1, further comprising generating said respective stack-pointer signals with values equal to first memory locations available within the respective part of memory stacks.

3. The process according to claim 1 wherein, in order to drive said two parts of stack, the process comprises the operation of generating:
a first signal, for discriminating between a push operation and a pop operation;
a second signal, for explicitly enabling the push operation or pop operation on said first part of memory stack; and
a third signal for explicitly enabling the push operation or pop operation on said second part of memory stack.

4. The process according to claim 3, wherein, when an interrupt occurs, the process comprises the operations of:
setting said first signal so as to obtain a push operation;
driving signals for writing said two parts of memory stack by setting said second signal and said third signal so as to decrement the respective stack pointers, so as to point to next available memory locations.

5. The process according to claim 3 wherein, in order to restore the state at the end of an interrupt, the process comprises the operations of:
setting said first signal so as to obtain a pop operation;
driving said second signal and said third signal so as to increment the stack pointers of said first part and said second part of stack, so as to point to a location containing a stored state to be restored; and
setting the signals for carrying out reading of said two parts of memory stack.

6. A stack management device associated with a microcontroller having a number of interrupts, the device comprising:
a first memory stack comprising a register for a Program Counter signal;
a second memory stack for a Condition Code Register signal that includes a number of bits, the second memory stack being made up of a bank of memory elements equal in number to the bits of said Condition Code Register signal times the number of interrupts of the microcontroller; and
at least one manager module configured to cause said first and second memory stacks to function in parallel by respective stack pointer signals.

7. The device according to claim 6, the at least one manager module is configured to generate said respective stack pointer signals with respective values equal to a first memory location of the first memory stack and a first memory location of the second memory stack, respectively.

8. The device according to claim 6 wherein said at least one manager module is configured for generating:
a first signal for discriminating between a push operation and a pop operation;
a second signal for explicitly enabling the push operation or pop operation on said first memory stack; and
a third signal for explicitly enabling the push operation or pop operation on said second memory stack.

9. The device according to claim 8, wherein said at least one manager module is configured for:
setting said first signal so as to obtain a push operation in response to an interrupt;
driving signals for writing said memory stacks; and
setting said second and said third signal so as to decrement the respective stack pointers so as to point to next available memory location in the memory stacks, respectively.

10. The device according to claim 8 wherein, in order to restore a state at an end of an interrupt, said at least one manager module is configured for:
setting said first signal so as to obtain a pop operation;
driving said second signal and said third signal so as to increment the stack pointers of said first and second stacks so as to point to respective locations containing the state to be restored; and
setting the signals for carrying out reading of said memory stacks.

11. The device according to claim 6, wherein the at least one manager module includes:
a control unit common to said first and second memory stacks; and
first and second manager modules associated, respectively, with said first and second memory stacks for sending to said memory stacks said respective stack-pointer signals according to respective signals for execution of operation generated by said control unit.

12. The device according to claim 11, wherein said control unit is configured for sending a first signal for discriminating between a push operation and a pop operation to said manager modules.

13. The device according to claim 6 wherein the second memory stack includes memory elements that are made up of flip-flops.

14. A computer-readable medium having contents that cause a computer to manage a memory stack in an interrupt stage according to a method comprising:
providing a first memory stack, comprising a register for a Program Counter signal, and a second memory stack, made up of a bank of memory elements equal in number to bits of a Condition Code Register signal times a total number of interrupts of the computer; and
causing said memory stacks to function in parallel by employing respective stack-pointer signals.

15. The computer-readable medium of claim 14, wherein the method further comprises generating said respective stack-pointer signals with values equal to first memory locations available within the respective part of memory stacks.

16. A stack management device associated with a microcontroller having a number of interrupts, the device comprising:
a first memory stack having a program counter register;
a second memory stack having a condition code register;
a control unit structured to output first and second control signals; and first and second manager modules connecting the control unit to the first and second memory stacks, respectively, the first and second manager modules being structured to send to the first and second memory stacks, respectively, respective first and second stack pointer signals according to the first and second control signals, respectively, received from the control unit.

17. The device of claim 16 wherein the first memory stack is stored in a memory having a word length corresponding to individually addressable data words and the second memory stack is made up of a bank of memory elements smaller in number than the word length of the first memory stack.

18. The device of claim 16 wherein the first manager module is configured to generate the first stack pointer signal with a value equal to a first memory location of the first memory stack and the second manager module is configured to generate the second stack pointer signal with a value equal to a first memory location of the second memory stack.

19. The device of claim 16, wherein the control unit is configured for sending to the manager modules a signal for discriminating between a push operation and a pop operation.

20. The device of claim 16 wherein the first memory stack is part of a random access memory and the second memory stack includes memory elements that are made up of flip-flops.

* * * * *